(12) United States Patent
Hognaland et al.

(10) Patent No.: US 10,819,126 B2
(45) Date of Patent: Oct. 27, 2020

(54) CHARGING STATION WITH MULTIPLE POWER SOURCES

(71) Applicant: Autostore Technology AS, Nedre Vats (NO)

(72) Inventors: Ingvar Hognaland, Nedre Vats (NO); Børge Bekken, Haugesund (NO); Ivar Fjeldheim, Haugesund (NO); Trond Austrheim, Etne (NO)

(73) Assignee: Autostore Technology AS, Nedre Vats (NO)

( * ) Notice: Subject to any disclaimer, the term of this patent is extended or adjusted under 35 U.S.C. 154(b) by 182 days.

(21) Appl. No.: 16/312,347

(22) PCT Filed: Jun. 21, 2017

(86) PCT No.: PCT/EP2017/065165
§ 371 (c)(1),
(2) Date: Dec. 21, 2018

(87) PCT Pub. No.: WO2017/220627
PCT Pub. Date: Dec. 28, 2017

(65) Prior Publication Data
US 2019/0232925 A1  Aug. 1, 2019

(30) Foreign Application Priority Data

Jun. 21, 2016 (NO) .................................. 20161039

(51) Int. Cl.
*H02J 7/00* (2006.01)
*B60L 53/80* (2019.01)
(Continued)

(52) U.S. Cl.
CPC ............ *H02J 7/0027* (2013.01); *B60L 53/30* (2019.02); *B60L 53/80* (2019.02); *B65G 1/0492* (2013.01);
(Continued)

(58) Field of Classification Search
CPC ...... H02J 7/0027; H02J 7/0021; H02J 7/0045; B65G 1/0492; B65G 1/0464;
(Continued)

(56) References Cited

U.S. PATENT DOCUMENTS

| 4,983,903 A | 1/1991 | Bae et al. |
| 5,187,423 A | 2/1993 | Marton |

(Continued)

FOREIGN PATENT DOCUMENTS

| EP | 0902521 A2 | 3/1999 |
| NO | 317366 B1 | 10/2004 |
| WO | 2015/104263 A2 | 7/2015 |

OTHER PUBLICATIONS

International Search Report issued in Application No. PCT/EP2017/065165, dated Sep. 11, 2017 (5 pages).
(Continued)

*Primary Examiner* — Jack Chiang
*Assistant Examiner* — Brandon Bowers
(74) *Attorney, Agent, or Firm* — Osha Liang LLP

(57) ABSTRACT

A storage system includes a charging station assembly for charging a plurality of power sources and a method thereof. The charging station assembly includes a charging station support fixing the charging station assembly to a base of the storage system, a plurality of charging stations, each charging station including a charger that charges the plurality of power sources and a power source transport device enabling relocation of the power source between an operational position on a remotely operated vehicle and a charging position in or at any one of the plurality of charging stations.

15 Claims, 7 Drawing Sheets

(51) Int. Cl.
   *B60L 53/30*   (2019.01)
   *B65G 1/04*   (2006.01)

(52) U.S. Cl.
   CPC .......... *H02J 7/0021* (2013.01); *H02J 7/0045* (2013.01); *B65G 1/0464* (2013.01); *B65G 1/0478* (2013.01); *Y02T 10/70* (2013.01); *Y02T 10/7072* (2013.01); *Y02T 90/12* (2013.01); *Y02T 90/14* (2013.01); *Y02T 90/167* (2013.01); *Y04S 30/12* (2013.01)

(58) Field of Classification Search
   CPC ....... B65G 1/0478; B60L 53/80; B60L 53/30; Y02T 10/70; Y02T 90/12; Y02T 90/167; Y02T 10/7072; Y02T 90/14; Y02T 10/7005; Y02T 90/168; Y02T 90/124; Y02T 90/121; Y04S 30/12
   USPC .......................................................... 320/109
   See application file for complete search history.

(56) References Cited

U.S. PATENT DOCUMENTS

| | | |
|---|---|---|
| 5,545,967 A | 8/1996 | Osborne et al. |
| 2010/0071979 A1 | 3/2010 | Heichal et al. |
| 2011/0106294 A1 | 5/2011 | Bebbington |
| 2012/0068664 A1 | 3/2012 | Franzen et al. |
| 2013/0064351 A1* | 3/2013 | Urbon ...................... A61B 6/56 378/98.5 |
| 2013/0343842 A1 | 12/2013 | Yu |
| 2016/0325932 A1* | 11/2016 | Hognaland .......... B65G 1/0478 |

OTHER PUBLICATIONS

Written Opinion issued in International Application No. PCT/EP2017/065165, dated Sep. 11, 2017 (12 pages).

International Preliminary Report on Patentability issued in PCT/EP2017/065165, dated Sep. 11, 2017 (32 pages).

Search Report issued in Norwegian Application No. 20161039, dated Jan. 21, 2017 (2 pages).

\* cited by examiner

CHARGING STATION WITH MULTIPLE POWER SOURCES

TECHNICAL FIELD

One or more embodiments of the present invention may relate to a storage system having a charging station for charging a plurality of power sources wherein the storage system comprises a base of rails arranged above a bin storing grid, a remotely operated vehicle and a charging station assembly, wherein the charging station assembly is for charging a plurality of power sources, and a method thereof.

BACKGROUND

A storage system having a charging station for charging remotely operated vehicles is known. A detailed description of such a relevant prior art storage system is presented in WO 2015/104263 A1, and details of a prior art vehicle relevant for use in such a storage system is disclosed in Norwegian patent NO317366. The prior art vehicle is configured to pick up and store storage bins within a three-dimensional storage grid. The bins are stacked on top of each other up to a certain height. The storage grid is normally constructed as columns interconnected by top rails onto which remotely operated vehicles, or robots, are arranged to move laterally. Each robot is equipped with a rechargeable battery providing electrical effect to an integrated motor. The robot typically communicates with a control system via a wireless link and is recharged at a charging station when needed, typically at night.

An example of a prior art storage system is illustrated in FIG. 1. The storage system 3 includes a plurality of robots 1 configured to move on dedicated supporting rails 13 and to receive a storage bin 2 from a storage column 8 within a bin storing grid 15. The prior art storage system 3 may also include a dedicated bin lift device 50, the latter being arranged to receive a storage bin 2 from the robot 1 at the top level of the storage system 3 and to convey the storage bin 2 down in a vertical direction to a delivery station, or port 60.

An example of prior art charging system is illustrated in FIG. 2 comprising a robot 1 with a battery 6 operated on a base 14 of rails 13 above a bin storing grid 15 and a plurality of charging stations 20,20' for charging the battery 6. The charging stations 20,20' are fixed to the base 14 in positions that are accessible for the part of robot 1 which includes the battery 6. FIG. 2 shows a particular situation where the robot 1 is approaching the charging station 20 in order to transfer an almost discharged battery 6 to a battery vacant charging station 20. After a successful transfer, the robot 1 is moved to another charging station 20' by aid of an auxiliary power source. The other charging station 20' is typically the closest charging station 20' that contains a battery 6' being charged to a fully operational level.

FIGS. 3(a) and (b) shows an example of a prior art robot 1 viewed from two different angles. The prior art robot 1 comprises a rectangular vehicle body or framework 4 displaying a cavity centrally arranged there within, a top cover 7 covering the top part of the body 4, and two sets of wheels 10,11 oriented perpendicular to each other. A vehicle lifting device 9 for lifting storage bins 2 are seen located within the cavity. The general configuration of the prior art robot 1 is to maximise the cavity size. Motors for the wheels 10,11 may for example be located adjacent to, or within, the respective wheels 10,11.

The additional step of moving the robot 1 from one charging station 20 to another 20' is time consuming. Moreover, this additional step necessitates a built-in auxiliary power source that results in an undesired increase in the minimum robot size and/or decrease in the maximum robot cavity size into which storage bins 2 are situated. This is particularly important when using a compact designed robot such as the robot illustrated in FIG. 3.

One or more embodiments of the present invention may enable a high overall operational cycle and a high number of simultaneously operating vehicles during handling of storage bins within a storage grid. One or more embodiments may provide a more efficient way of effectively charging a multiple number of batteries within a smallest possible area.

SUMMARY

The present invention is defined by the attached claims and in the following:

In a first aspect, one or more embodiments of the present invention may provide a storage system comprising a base of rails arranged above a bin storing grid, a remotely operated vehicle and a charging station assembly, wherein the charging station assembly is for charging a plurality of power sources and comprises
a charging station support fixing the charging station assembly on/at/to the base,
a plurality of charging stations, each charging station comprising charging means for charging one of the plurality of power sources,
a power source transport device enabling relocation of any one of the power sources between an operational position on the remotely operated vehicle and a charging position in or at one of the plurality of charging stations, wherein
the power source transport device comprises a power source lift vertically movable between
  a vertical position in line with, or near in line with, a power source position on the remotely operated vehicle when the remotely operated vehicle is situated on the base and
  a vertical position in line with, or near in line with, any one of the plurality of charging stations and
the power source lift comprises power source connection means comprising a horizontally movable support and
at least one connecting device fixed to the horizontally movable support for reversibly disconnecting the power source from its operational position on the remotely operated vehicle during use.

In one or more embodiments of the storage system, the power source lift comprises
a vertically movable frame, and the power source connection means are horizontally movable on the vertically movable frame.

In one or more embodiments of the storage system, each power source comprises a connecting interface for interaction with the at least one connecting device.

In one or more embodiments of the storage system, the connecting device is a connecting pin. In one or more embodiments, the connecting device is at least two connecting pins. The at least one connecting pin may advantageously extend in a vertical direction and may extend from the horizontally moveable support in an upwards vertical direction.

In one or more embodiments of the storage system, the connecting interface comprises at least one cavity for accommodating the at least one connecting pin. In yet an embodiment, the connecting interface comprises a cavity for each of the at least two connecting pins.

In one or more embodiments of the storage system, the power source transport device comprises
- a vertical directed drive shaft drivingly connected to the power source lift and
- a remotely operated motor for driving the drive shaft.

In one or more embodiments, the vertical directed drive shaft is drivingly connected to the power source lift via cooperating threads arranged on the drive shaft and the lift, such that the power source lift is moved in a direction dependent on the rotational direction of the vertical directed drive shaft.

In one or more embodiments of the storage system, the power source transport device comprises
- a remotely operated motor and
- at least one vertical directed, or near vertical directed, column fixed at one longitudinal end to the charging station support and extending at least to the uppermost charging stations, wherein the power source lift is vertically slidable along the column by aid of the remotely operated motor.

When the power source transport device comprises at least two columns, the columns may be situated symmetrically around the drive shaft.

In one or more embodiments of the storage system, the power source transport device comprises
- a vertical directed drive shaft drivingly connected to the power source lift,
- a remotely operated motor for driving the drive shaft and
- at least two vertical directed, or near vertical directed, columns situated symmetrically on each side of the drive shaft, wherein each column is fixed at one longitudinal end to the charging station support and extending at least beyond the uppermost charging stations.

In one or more embodiments of the storage system, the power source lift comprises
at least one horizontally extending protrusion, and
the at least one column displays/comprises
at least one protrusion receiving recess extending along the at least one column,
wherein the power source lift and the at least one column is configured such that the at least one protrusion is sliding within the at least one recess during the vertical movement of the power source lift.

In one or more embodiments of the storage system, the plurality of charging stations is surrounded by a charging station framework/housing in which the power source lift may enter from below and move within.

In one or more embodiments of the storage system, the charging station assembly comprises a control system for controlling charging of the power sources arranged in a charging position within the charging stations, the control system comprising
- monitoring means for monitoring a state of charge of the power sources and
- signal communication means for communicating the state of charge of the power sources to at least one receiver at the power source transport device or a remote operator or a combination thereof.

In a second aspect, one or more embodiments of the present invention may provide a method for charging a plurality of power sources by a charging station assembly of a storage system, the storage system comprising a base of rails arranged above a bin storing grid and a remotely operated vehicle, and the charging station assembly comprises a charging station support fixing the charging station assembly on/at/to the base, the method comprising the following sequential steps:
- a) driving the remotely operated vehicle with a power source to be charged to a remotely controlled charging station assembly comprising a power source lift,
- b) lowering the power source lift to a vertical position, or keeping the power source lift in a lowered vertical position, corresponding to the vertical position which makes step c) possible,
- c) horizontally and/or vertically positioning a power source connection means of the power source lift to a position in which the power source may be disconnected from the remotely operated vehicle, the power source connection means comprises a horizontally movable support and at least one connecting device fixed to the horizontally movable support for reversibly disconnecting the power source, and
- d) disconnecting the power source from the remotely operated vehicle.

In one or more embodiments, the method comprises the step of:
- e) retracting the power source connection means to the position of step b).

In one or more embodiments, the method comprises the step of:
- f) lifting the power source lift with the power source to a charging station configured to receive and charge the power source, the charging station being one of a plurality of charging stations.

In one or more embodiments, the method comprises the step of:
- g) horizontally positioning the power source connection means of the power source lift to a position in which the power source is connected in a charging position into the charging station.

In one or more embodiments of the method, the vertical position in step b) is in line with, or immediately below, or immediately above, the vertical position of the power source.

In one or more embodiments, the method comprises the steps of:
- h) horizontally and/or vertically positioning the power source connection means of the power source lift to a position of a charged power source arranged in the charging station and retrieving the charged power source,
- i) lowering the power source lift to a vertical position corresponding to the vertical position which makes step j) possible,
- j) horizontally and/or vertically positioning the power source connection means of the power source lift to a position in which the charged power source may be connected to the remotely operated vehicle, and
- k) connecting the charged power source to the remotely operated vehicle.

In one or more embodiments of the method, the charging station assembly is according to any embodiment of the first aspect.

In relation to the present invention, the term 'connection device' should be interpreted as any device, such as any suitable mechanical device, including pins, hooks or claws, and/or any suitable electromagnetic device, that may remove/replace the power source from/to its operational position in the remotely operated vehicle and/or its position in the charging station.

In the following description, numerous specific details are introduced to provide a thorough understanding of embodiments of the claimed charging station assembly and corresponding method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

DETAILED DESCRIPTION

Figure 1:
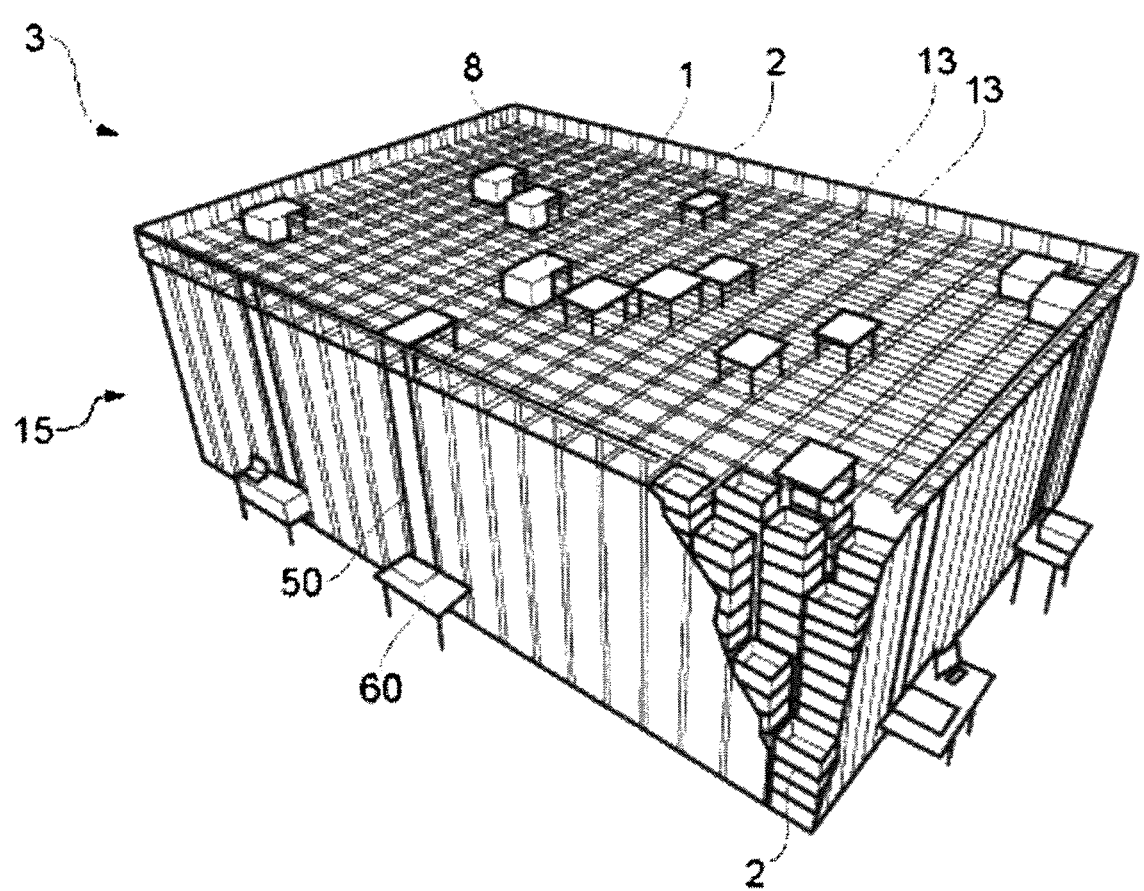
FIG. 1 is a perspective view of a prior art storage system in accordance with one or more embodiments.
Figure 2:
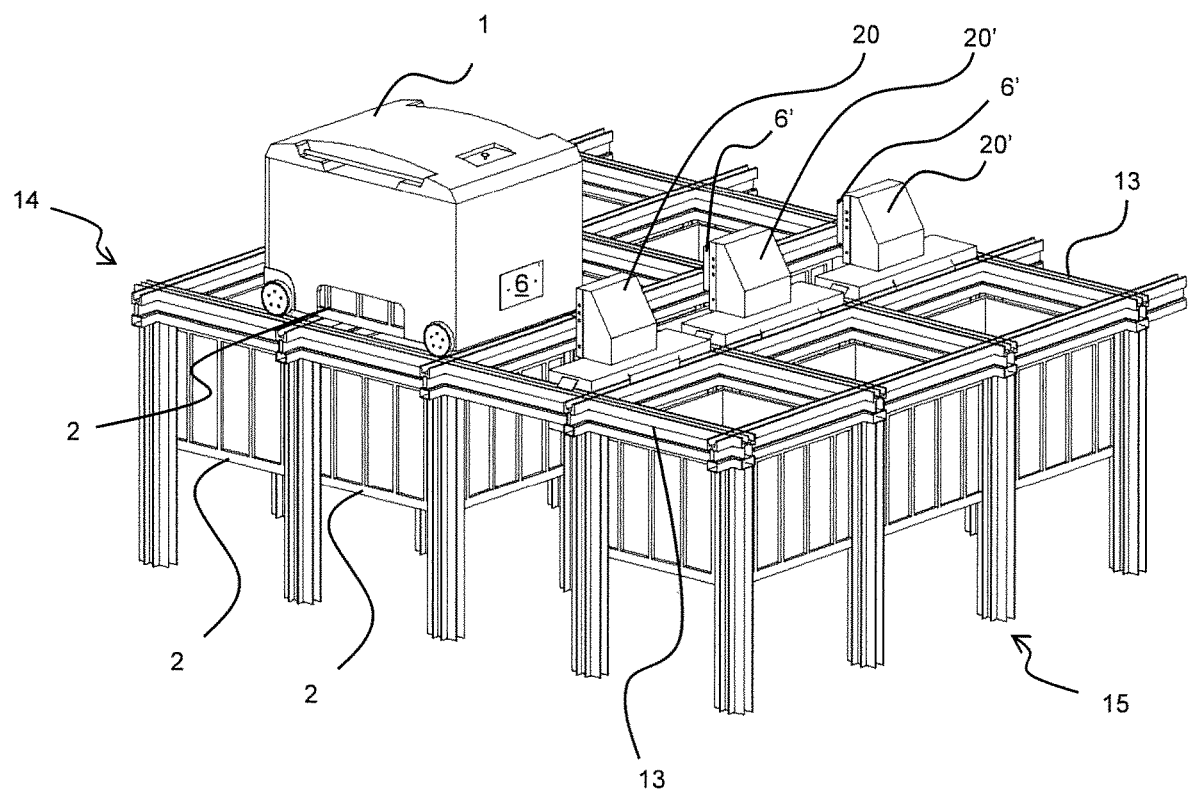
FIG. 2 is a perspective side view of part of a prior art storage system including a bin storing grid, a base, a robot and a plurality of charging stations in accordance with one or more embodiments.

FIGS. 1 and 2 give perspective views of prior art storage systems as described in further details above.

Figure 3:
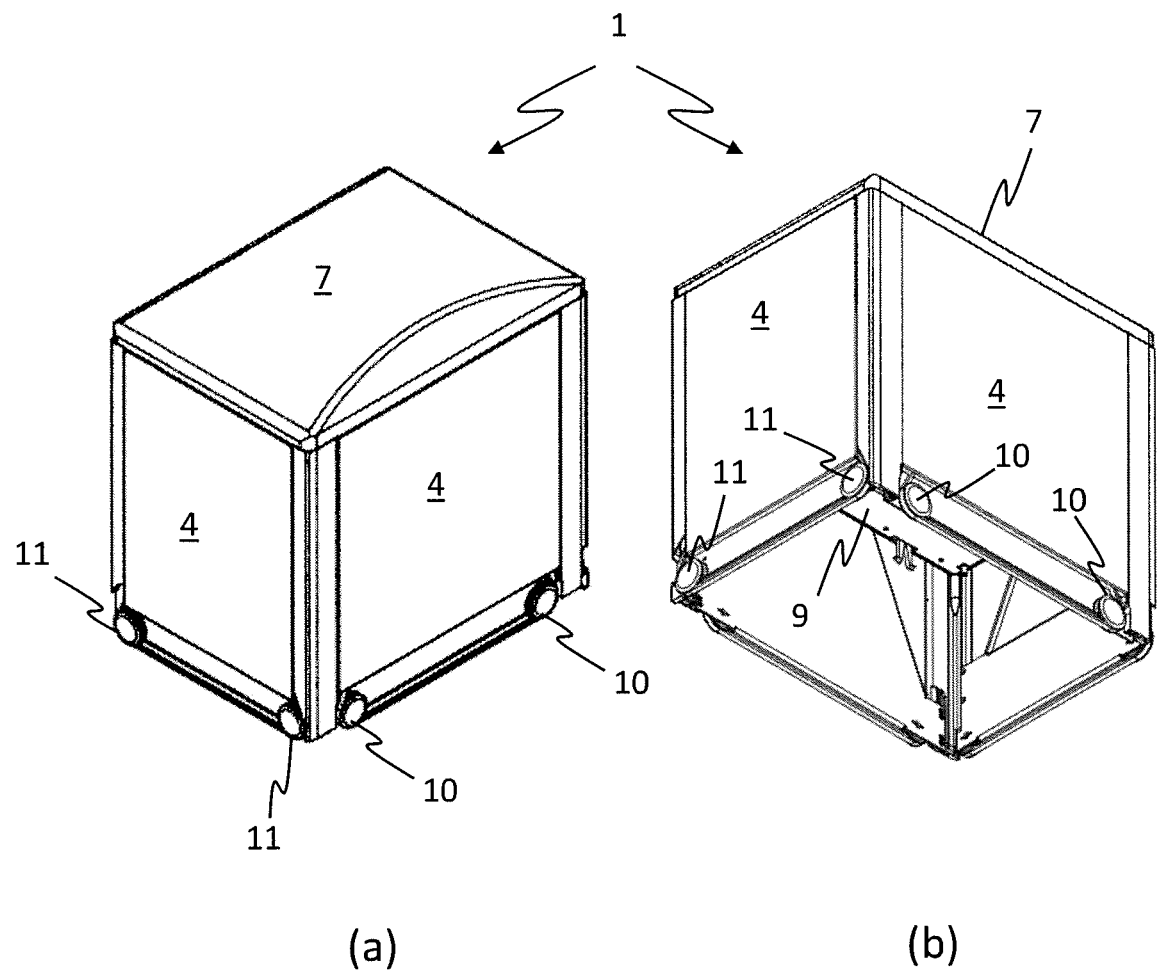
FIGS. 3(a) and (b) are perspective views of a prior art remotely operated vehicle, observed from two different angles in accordance with one or more embodiments.

FIG. 3 gives perspective views in two different angles of a robot 1 that may be used as part of the inventive charging station. This particular robot 1 comprises a rectangular vehicle body or framework 4 displaying a cavity 7 centrally arranged there within, a top lid 72 covering the top part of the body 4, a first set of four wheels 10 mounted inside the cavity 7 and a second set of four wheels 11 mounted at the exterior walls of the body 4. The first and second set of wheels 10,11 are oriented perpendicular to each other.

Figure 4:
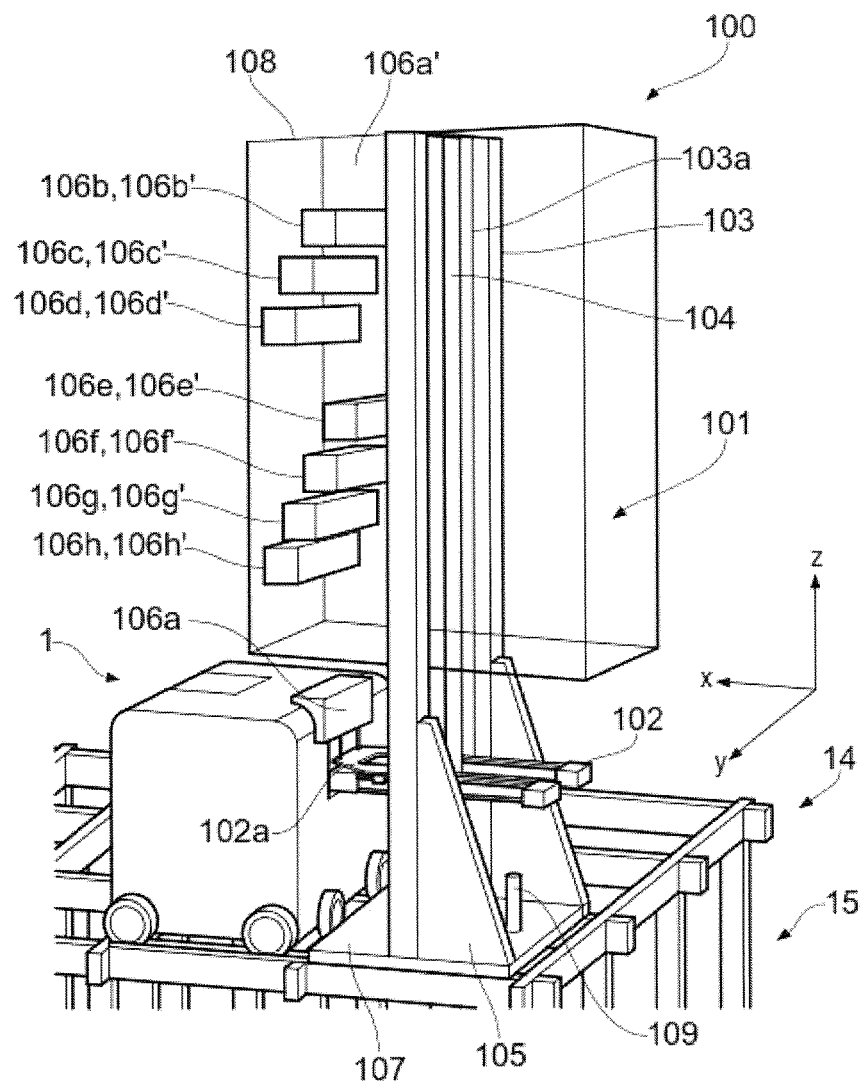
FIG. 4 is a perspective view of a storage system with a remotely operated vehicle and a charging station for multiple power sources according to the invention in accordance with one or more embodiments.

FIG. 4 shows a part of a storage system 14,15 where the robot 1 is positioned near a multiple charging station 100 according to the invention. The multiple charging station 100 includes a transport device 101 for transporting a battery 106a-h from an operational position on or within the robot 1 to a charging position in one of a plurality of charging stations 106a'-h' located within a cuboid enclosure 108 which partly encloses the transport device 101. The enclosure 108 is open at least at its lower end for enabling a battery lift 102 of the transport device 101 to move freely between a lower position intended for removing a battery 106a from its operational position and an upper position intended for placing the battery 106a into its the charging position within any available/void charging station 106a'.

For the sake of clarity a Cartesian coordinate system is shown with its X, Y and Z axes aligned along the principal directions of the storage system 14,15. Any direction within the X,Y plane is referred to as a horizontal direction and any direction along the z-direction is referred to as a vertical direction.

In the particular embodiment shown in FIG. 4, the battery lift 102 may be moved in a vertical direction (z-direction) via a drive shaft 104 connected to a remotely operated motor 109. To ensure stability of the charging station 100 as a whole, as well as to ensure predictable movements of the battery lift 102 during operation, the transport device 101 also includes two vertical support columns 103 situated symmetrically on each side of the battery lift 102 along the y-direction. The support columns 103 has guiding tracks 103a, into which protrusions 102d extending on both sides of the battery lift 102 towards the columns 103 are inserted in order enable stable vertical movements. Each protrusion 102d may be shaped as a mushroom, where the horizontal widths of the mushroom head and the mushroom trunk in the x-direction are larger and smaller, respectively, than the corresponding horizontal width of the guiding tracks 103a.

Figure 5:
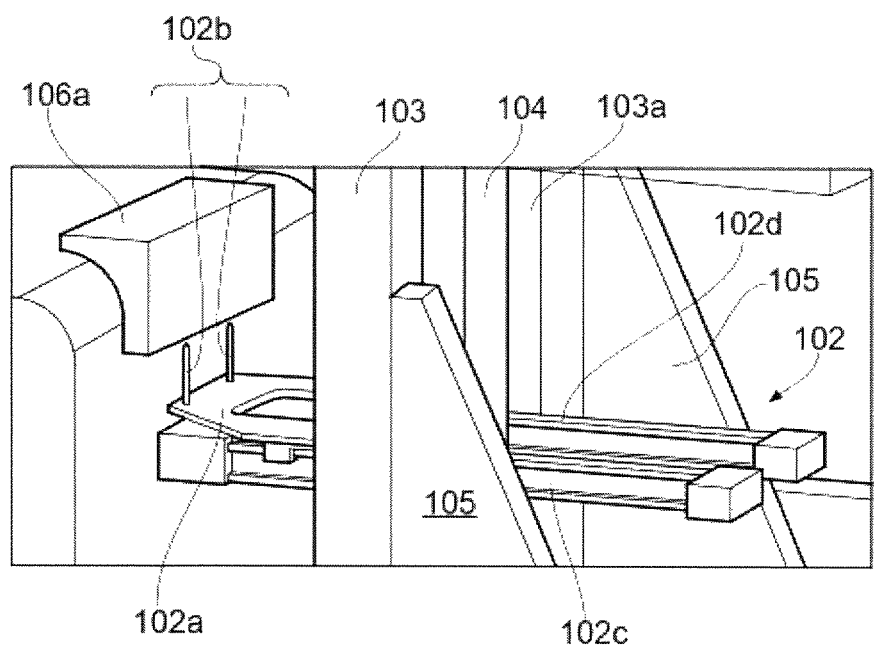
FIG. 5 is a perspective view showing further details of the interconnection between the power source of the remotely operated vehicle and the charging station illustrated in FIG. 4 in accordance with one or more embodiments.

FIG. 5 shows in further details the mechanism 102a,b for inserting/removing the battery 106a-h to/from the operation position on the robot 1, the mechanism 102a,c for horizontal movements towards/from the operational position and the mechanism 102d,103a for guiding the battery lift 102 in the vertical direction along the support columns. For inserting/removing of the battery 106a the particular embodiment utilizes connecting pins 102b fixed at one end to a support plate 102a. The pins 102b are vertically guided into corresponding cavities (not shown) situated at the lower face of the battery 106a by raising the battery lift 102 until the battery 106a is abutting, or near abutting, the support plate 102a. Furthermore, the support plate 102a may be horizontally adjusted on a vertically movable frame 102c. The horizontal movement may for example be achieved using the same principles as for the vertical movement, i.e. using a drive shaft in the x-direction rotationally connected to the motor 109. However, any drive mechanism known in the art capable of moving the support plate, or the entire battery lift 102, horizontally may be envisaged. Moreover, any means for connecting/disconnecting a battery 106a from a robot 1 may be envisaged, involving mechanical means, magnetic means or a combination of both. The battery comprises electric connectors for connecting to cooperating connectors on the robot 1 and perhaps on the charging station. Various types of connectors are obvious to the skilled person based on the present disclosure and include for instance stab/receptacle type connectors (i.e. male/female connectors) and slide/blade connectors.

Figure 6:
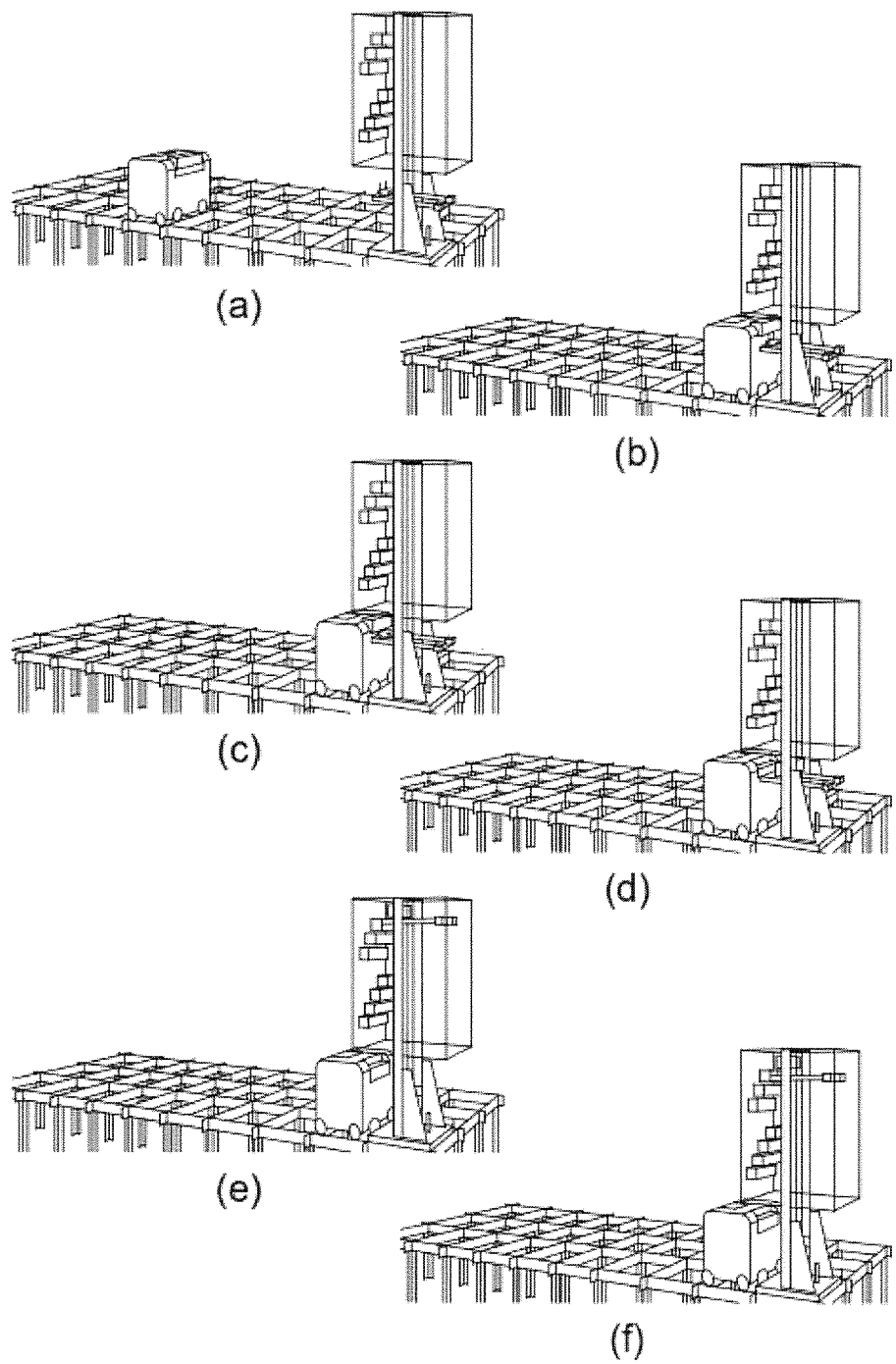
FIG. 6(a)-(j) are perspective views of the storage system at various stages of an exchange of a discharged power source on a remotely operated vehicle with a fully charged power source picked from a charging station assembly in accordance with one or more embodiments.
Figure 6:
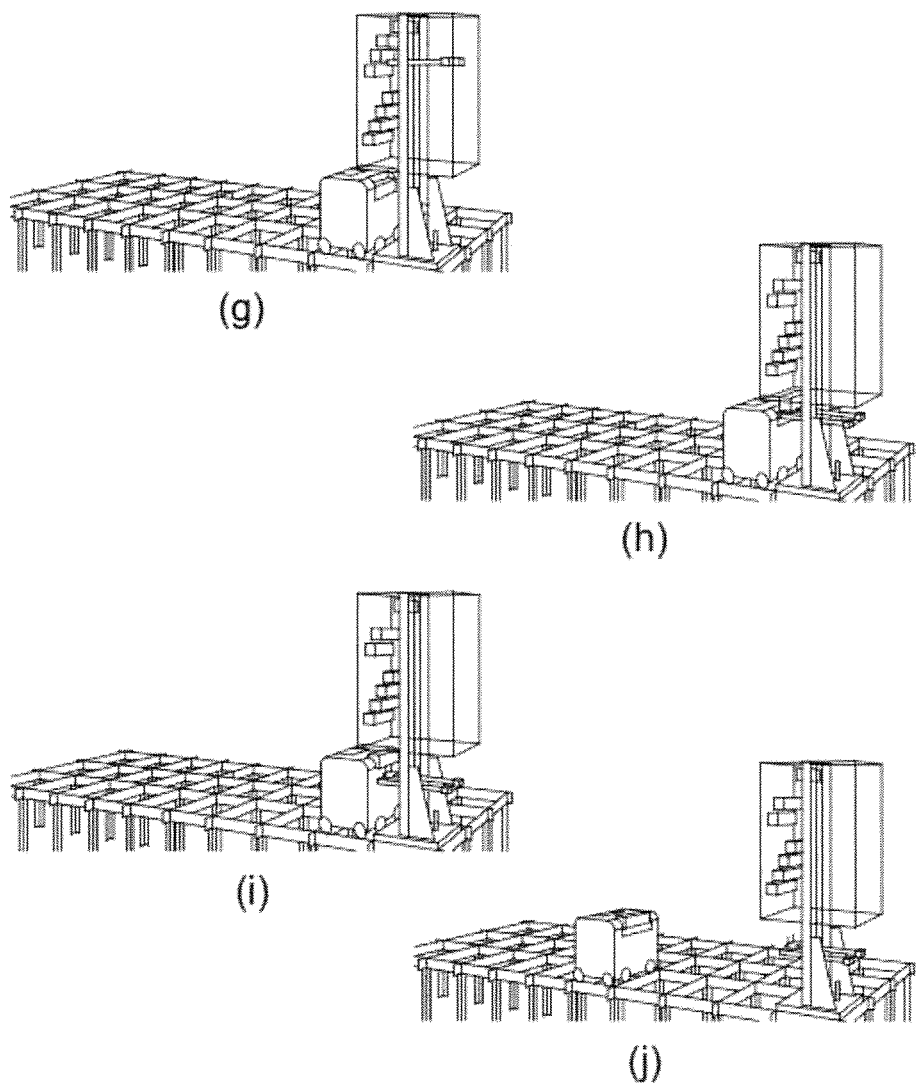

With reference to FIGS. 4-6, and in particular FIG. 6(a)-(j), the replacement of a discharged, or nearly discharged, battery 106a connected to a robot 1 with a charged battery 106b from the multiple charging station 100 may be achieved in the following manner:

(a) the battery lift 102 is lowered to, or remain in, a vertical position suitable for disconnecting the battery 106a connected to the robot 1 and the robot 1 is instructed to move into a predetermined position near the charging station 100, (b) when the robot 1 is in position, the support plate 102a with its connecting pins 102b are horizontally adjusted in order to align the pins 102b below the corresponding cavities within the lower part of the battery 106a, (c) the battery lift 102 is raised to a position where the base of the battery 106a abuts, or near abuts, the upper surface of the support plate 102a, (d) the support plate 102a with the battery 106a is retracted horizontally to a position where the battery lift 102 may be lifted vertically into the enclosure 108 with the multiple charging stations 106a'-g',
(e) the battery lift 102 with the battery 106a is lifted vertically to an available/void charging station 106a' within the enclosure 108,
(f) the battery lift 102 is horizontally adjusted and placed in a charging position within the charging station 106a',
(g) the battery lift 102 is moved to any one of the other batteries 106b-g being charged within the multiple charging station 100, for example battery 106b within charging station 106b', and the battery lift 102 is subsequently horizontally aligned in a position where the connecting pins 102b are aligned below the corresponding cavities and then raised and retracted in the same manner as in steps (b) to (d),
(h) the battery lift 102 with the charged battery 106b is lowered to a position below the enclosure 108 and into a vertical and horizontal position above the robot's 1 battery holder,
(i) the battery lift 102 is lowered until the battery 106b is in an operational position on the robot 1 and the connecting pins 102b have been released from the battery 106b and
(j) the robot 1 is instructed to continue its task of removing/storing bins 2 within the storage grid 15.

In the particular embodiment shown in FIGS. 4-6, the movement between the lower and the upper positions involves horizontal and vertical movements separated in time. However, alternative movement paths of the batteries 106a-h are feasible. For example, if the batteries 106a-h are mounted on the top surface of the robot 1 one may envisage purely vertical movements during placement/disconnection of batteries 106a-h from the robot 1. In this alternative embodiment the battery lift 102 is lowered vertically, then grabs the battery 106a using for example hooks or claws, and finally raised, all operation performed by vertical movements. Movement paths involving simultaneous horizontal and vertical movements are also possible. For example, the horizontal movements of the support plate 102a may start before the battery lift 102 has reached its final positions, thereby reducing operational time.

All operations of both the robots 1 and the multiple charging stations 100 may be controlled by wireless communication means and remote control units. For example, multiple charging stations 100 may be equipped with a control system allowing control of the charging process by monitoring the state of charge of each battery 106a-h during charging and wirelessly communicating the state of charge real-time to the operator and/or to a receiver in the transport device 101. The motor 109 may be programmed accordingly. The communication of the state of charge to the transport device 101 may be achieved directly or via another system.

In the preceding description, various aspects of the charging station assembly and the method according to the invention have been described with reference to the illustrative embodiment. For purposes of explanation, specific numbers, systems and configurations were set forth in order to provide a thorough understanding of the apparatus and its workings. However, this description is not intended to be construed in a limiting sense. Various modifications and variations of the illustrative embodiments, as well as other embodiments of the assembly, which are apparent to persons skilled in the art to which the disclosed subject matter pertains, are deemed to lie within the scope of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

LIST OF REFERENCE NUMERALS/LETTERS

1 Remotely operated vehicle/robot
2 Storage bin
3 Storage system
4 Vehicle body/framework
6 Power source/battery for single battery charging station
7 Top cover
8 Storage column
9 Vehicle lifting device
10 First set of wheels
11 Second set of wheels
13 Supporting rail
14 Base
15 Bin storing grid
20 Charging station for a single power source/battery
   20' Adjacent charging station for a single power source/battery
50 Bin lift device
60 Delivery station/port
100 Charging station assembly for multiple power sources/multiple charging station
101 Power source transport device/transport device
102 Power source lift/battery lift
   102a Horizontally movable support/support plate
   102b Connecting pins
   102c Vertically movable frame/frame
   102d Guiding track protrusion/protrusion
103 Vertical support columns
   103a Guiding track
104 Drive shaft for power source lift
105 Stabilizing elements for vertical support columns
106a-g Power source/battery for multiple batteries charging station
   106a'-g' Charging stations
107 Support stand for charging station/charging station support
108 Charging station framework with support for power sources/enclosure
109 Drive shaft motor/motor

The invention claimed is:
1. A storage system comprising:
a bin storing grid;
a base of rails arranged above the bin storing grid; and
a remotely operated vehicle and a charging station assembly,
wherein the charging station assembly is configured to charge a plurality of power sources and comprises:
a charging station support that fixes the charging station assembly on the base;
a plurality of charging stations, each charging station comprising a charger that charges one of the plurality of power sources; and
a power source transport device enabling relocation of any one of the power sources between an operational position on the remotely operated vehicle and a charging position in or at one of the plurality of charging stations;
wherein the power source transport device comprises a power source lift vertically movable between a first vertical position in line with, or near in line with, a power source position on the remotely operated vehicle when the remotely operated vehicle is situated on the base and a second vertical position in line with, or near in line with, any one of the plurality of charging stations, the first vertical position at a lower level than the second vertical position, and the power source lift comprises power source connector comprising a horizontally movable support, and at least one connecting device fixed to the horizontally movable support for reversibly disconnecting the power source from its operational position on the remotely operated vehicle during use.

2. The storage system according to claim 1, wherein the second vertical position is at a level above an uppermost level of the remotely operated vehicle.

3. The storage system according to claim 2, wherein a lowermost level of the charging station framework is higher than an uppermost level of the remotely operated vehicle.

4. The storage system according to claim 1, wherein the plurality of charging stations are surrounded by a charging station framework into which the power source lift enters from below and moves within.

5. The storage system according to claim 1, wherein the power source transport device comprises a remotely operated motor and at least one vertically directed column fixed at one longitudinal end to the charging station support and extending at least to the uppermost charging stations, and the power source lift is vertically movable along the column by aid of the remotely operated motor.

6. The storage system according to claim 5, wherein the power source transport device comprises:

a vertical directed drive shaft drivingly connected to the power source lift; and the remotely operated motor that drives the drive shaft.

7. The storage system according to claim 5, wherein the at least one vertically directed column comprises:

at least two vertical directed columns situated symmetrically on each side of the drive shaft;

wherein each column is fixed at one longitudinal end to the charging station support and extending at least beyond the uppermost charging stations.

8. The storage system according to claim 5, wherein the power source lift comprises:

at least one horizontally extending protrusion; and the at least one column displays at least one protrusion receiving recess extending along the at least one column;

wherein the power source lift and the at least one column is configured such that the at least one protrusion is sliding within the at least one recess during vertical movement of the power source lift.

9. The storage system according to claim 1, wherein the power source lift comprises:

a vertically movable frame; and the power source connector that is horizontally movable on the vertically movable frame.

10. The storage system according to claim 1, wherein each power source comprises a connecting interface for interaction with the at least one connecting device.

11. The storage system according to claim 1, wherein the connecting device is a connecting pin.

12. The storage system according to claim 11, wherein the connecting interface is at least one cavity for accommodating the at least one connecting pin.

13. The storage system according to claim 1, wherein the charging station assembly comprises a control system that controls charging of the power sources arranged in a charging position within the charging stations, the control system comprising:

a monitor that monitors a state of charge of the power sources; and signal communicator that communicates the state of charge of the power sources to at least one receiver at the power source transport device or a remote operator or a combination thereof.

14. A method of replacing the power source of the remotely operated vehicle in the storage system according to claim 1, comprising:

a. driving the remotely operated vehicle into a predetermined position below the plurality of charging stations;

b. lowering the power source lift to the first position;

c. horizontally positioning the power source connector to a position in which the power source may be disconnected from the remotely operated vehicle;

d. disconnecting the power source from the remotely operated vehicle; and e. lifting the power source lift to the second position;

wherein steps b and c are performed before, after or simultaneous to step a.

15. A method according to claim 14, comprising the step of:

f. horizontally positioning the power source connector to a position in which the power source is connected in a charging position in a charging station.

* * * * *